July 4, 1950 J. A. DORNER 2,513,460
FRICTION AND POSITIVE CLUTCH FOR TOOL DRIVERS
Filed March 26, 1945
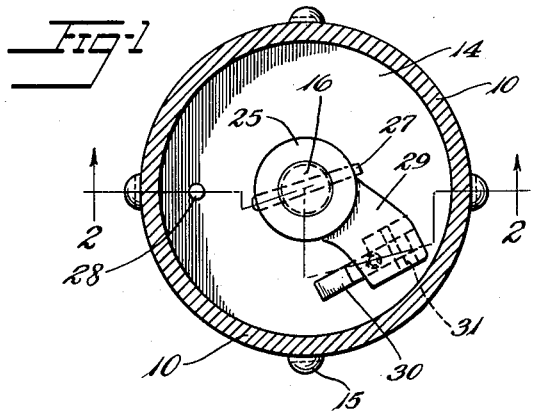
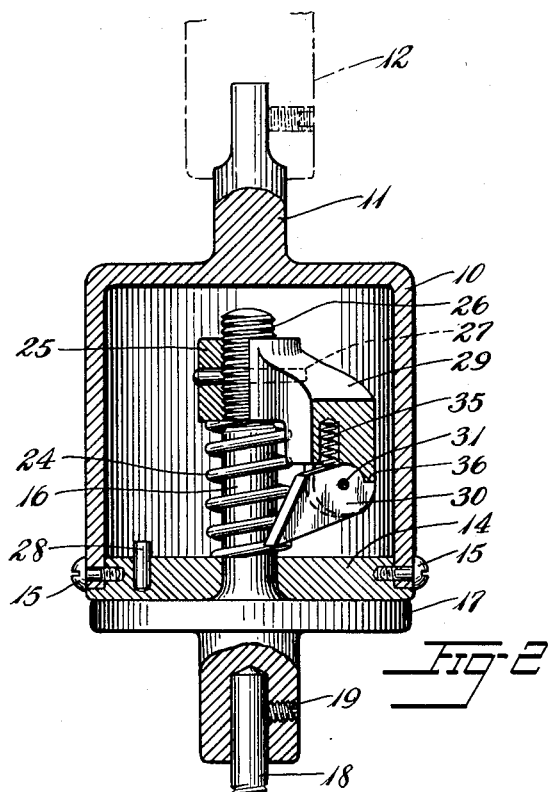
Inventor
John A. Dorner
By
Atty.

Patented July 4, 1950

2,513,460

UNITED STATES PATENT OFFICE 2,513,460

FRICTION AND POSITIVE CLUTCH FOR TOOL DRIVERS

John A. Dorner, Akron, Ohio, assignor to The B. F. Goodrich Company, New York, N. Y., a corporation of New York Application March 26, 1945, Serial No. 584,895

1 Claim. (Cl. 192—48)

This invention relates to drivers for transmitting rotative motion and is especially useful for driving thread gauges, studs, nuts, or screws, although the invention is also useful for other purposes.

Where threaded openings are to be gauged, it has been customary to enter and withdraw threaded plug gauges by hand, as any forcing of the gauge into the work by the use of more force than could be exerted by the fingers of the operator would damage the gauge or the opening. The gauging of threaded openings by hand has consumed a great amount of time and has required a certain amount of skill.

Objects of the present invention are to overcome the foregoing and other difficulties, to provide power-driven operation of a plug gauge, to provide limited driving force for entering the plug and a positive driving force for retracting it, and to provide for proper alignment of the gauge with the opening.

These and other objects will appear from the following description, and the accompanying drawings.

Of the drawings,

Fig. 1 is a cross-sectional view of a driver constructed in accordance with and embodying the invention.

Fig. 2 is an axial sectional view thereof, taken on line 2—2 of Fig. 1, the driving spindle being indicated in dot-and-dash lines, and the driven spindle being partly broken away and shown in section.

Referring to the drawings, the numeral 10 designates a cylindrical hollow open-ended housing portion of a driving spindle having a shank 11 whereby it may be secured to the driving spindle 12 of a machine. The machine is adapted to drive the spindle 12 in either direction and may comprise a drill press having a tapping head mounted thereon so that when the drill press spindle is advanced toward the work, the spindle is driven in one direction and, when the spindle is withdrawn, the spindle is rotated in the opposite direction.

The open end of the housing 10 is covered by a plate 14 which is secured thereto by screws 15. Plate 14 has a central aperture in which is journaled a driven spindle 16. Spindle 16 is formed with an integral clutch disc 17 which bears on the face of plate 14. It also has an axial socket for receiving a tool, such as the plug thread gauge 18. A set-screw 19 secures the tool to the shaft.

For frictionally driving the gauge 18 in a counter-clockwise direction, as seen when looking at the lower end thereof, to enter the plug gauge in the threaded opening 20 of a work piece 21 to be tested, a compression coil spring 24 is mounted on the spindle 16 between the plate 14 and a collar 25. Collar 25 is threaded to engage threads 26 of the spindle whereby it may be adjusted along the spindle to adjust the tension of the spring and, therefore, the clutching force between plate 14 and disc 17. It is held in its adjusted position by a taper pin 27 extending through the collar and the spindle. The arrangement is such that the driving friction may be set at a safe amount and should the hole 20 be too small or the plug reach the bottom of the hole, the spindle 16 stops rotating, indicating to the operator that the plug should be withdrawn.

For positively withdrawing the plug by rotating it in the opposite direction, a driving pin or stop 28 is fixed to plate 14 and projects into the housing. An arm 29 is fixed to collar 25 and has a ratchet pawl 30 pivotally mounted thereon, as at 31. A compression coil spring 35 is seated in arm 29 and bears against pawl 30 holding it in the path of pin 28. A stop shoulder 36 on the pawl is adapted to engage arm 29 and limit movement of the pawl under influence of spring 35. The arrangement is such that when the housing 10 is driven in a clockwise direction, when looking at the end of the plug gauge, the pin 28 engages the pawl 30 and drives the spindle 16 positively, and when the housing 10 is driven in the opposite direction, the pawl 30 is depressed against the arm 29 by contact of the pin 28 with its inclined lower surface and permits passage of the pin.

While the tool driver has been illustrated and described as manipulating a plug gauge, it may also be used for driving a socket wrench or screw driver for driving screws, nuts, or bolts by limited torque.

These and other variations may be made without departing from the scope of the invention as it is defined by the following claim.

I claim:

A tool driver for rotating a tool in opposite directions, said driver comprising a shank having positive driving connection with a power-driven spindle, a cylindrical housing integral with said shank and coaxial therewith, a friction disc secured to said housing and having a central aperture coaxial with said spindle, a second spindle mounted in said aperture for rotation therein, said second spindle having a flange engaging said friction disc, a radial arm on said second spindle within said housing, spring means about said second spindle within said housing between said arm and said friction disc to apply frictional driving pressure between said friction disc and said second spindle for driving the second spindle in one direction, a stop on said friction disc, and ratchet means on said arm for positively engaging said stop on said friction disc for positively driving said second spindle in the opposite direction.

JOHN A. DORNER.

REFERENCES CITED

The following references are of record in the file of this patent:

UNITED STATES PATENTS

| Number | Name | Date |
| --- | --- | --- |
| 458,408 | Schwanhausser | Aug. 25, 1891 |
| 748,018 | Rowe | Dec. 29, 1903 |
| 1,173,316 | Segal | Feb. 29, 1916 |
| 1,494,056 | Benko | May 13, 1924 |
| 1,886,323 | Wemp | Nov. 11, 1932 |
| 2,055,803 | Rafter | Sept. 29, 1936 |
| 2,293,786 | Worden | Aug. 25, 1942 |
| 2,378,956 | Thorner | June 26, 1945 |

FOREIGN PATENTS

| Number | Country | Date |
| --- | --- | --- |
| 391,837 | Great Britain | May 5, 1932 |